UNITED STATES PATENT OFFICE 2,653,141

PARTIAL ESTERS OF POLYHYDROXYL POLYETHERS

Sylvan Owen Greenlee, Louisville, Ky., assignor to Devoe & Raynolds Company, Inc., Louisville, Ky., a corporation of New York No Drawing. Application December 3, 1945, Serial No. 632,594

8 Claims. (Cl. 260—18)

This invention relates to new synthetic drying compositions and more particularly to new synthetic unsaturated esters which are semi-solids or solids at ordinary temperatures.

The new synthetic esters are readily soluble in volatile solvents and the solutions are valuable coating and film-forming compositions for use as varnishes or in making paints, films, etc.

Solutions of the new solid or semi-solid unsaturated esters in volatile solvents give quick drying coating and film-forming compositions which form a dry film on evaporation of the solvent or shortly thereafter and a film which is capable of further conversion by air oxidation or heat hardening to a final insoluble, infusible film.

The new synthetic drying compositions are made by partial or limited esterification with unsaturated fatty acids of high molecular weight of resinous polyhydric alcohols and more particularly of high molecular weight polymeric polyether polyhydric alcohols which are polyether derivatives of polyhydric phenols having hydroxyl-containing aliphatic radicals united to the phenolic residues through ether linkages. Such high molecular weight polyhydric alcohols can readily be made of semi-solid or solid consistency and of high molecular weight. When such polymeric polyhydric alcohols are subjected to limited esterification with unsaturated fatty acids they give products which are still semi-solid or solid and which are soluble in volatile solvents to give quick drying coatings, the initial drying being by evaporation of the volatile solvent and the resulting dry film further hardening by air oxidation or heat hardening.

The unsaturated fatty acids used for esterifying the high molecular weight polyhydric alcohols include unsaturated acids derived from drying, semi-drying and non-drying oils, such as vegetable oils and oils obtained from marine life. Such acids are those derived from fish oils, e. g., clupanodonic acid and those derived from cottonseed oil, linseed oil, China-wood oil, oiticica oil, soy bean oil, corn oil and other unsaturated vegetable oils.

The high molecular weight polyhydric alcohols which are subjected to partial or limited esterification to produce the new esters, are advantageously prepared by the reaction of polyhydric phenols with polyhalo alcohols, epihalohydrins, of polyepoxide compounds to form complex reaction products containing several alcoholic hydroxyl groups per molecule. In certain cases the halohydrins or epoxy compounds used in making the polyhydric alcohols introduce epoxy groups as well as alcoholic hydroxyl groups into the high molecular weight product to give products which are hydroxy-epoxy products containing a plurality of alcoholic hydroxyl groups and one or more epoxy groups. For purposes of esterification epoxy groups when present act for the most part as glycol groups in reaction with organic acids, one epoxide group being in general equivalent to two alcoholic hydroxyl groups.

The new drying compositions of the present invention are made by partial or limited esterification with unsaturated acids of such high molecular weight polyhydric alcohols.

One of the objects of the present invention is the production of fusible, soluble solid resin esters of unsaturated acids which convert on exposure to air to infusible, insoluble products which have remarkable chemical resistance, combined with hardness, toughness, flexibility, and other desirable properties.

Another object of the invention is the production of fusible, soluble, resin esters of unsaturated acids which contain free alcoholic hydroxyl groups and which are capable of conversion into infusible, insoluble products on exposure to air.

Another object of the invention is the production of quick drying solutions in volatile solvents of such partial or limited esters of high molecular weight polyhydric alcohols.

Another object of the invention is the production of quick drying synthetic unsaturated esters, of high molecular weight polyhydric alcohols or hydroxy-epoxy compounds which are partial esters containing unesterified hydroxyl groups which give adherent films highly resistant to water and alkali.

It is a further object of the invention to provide coating solutions such as varnishes, paints, etc. in which such esters of high molecular weight alcohols in organic solvents are used to give quick drying solid unsaturated films capable of further driving on hardening.

It is a further object of the invention to provide quick drying coating compositions in volatile solvents which quickly dry to a solid film by solvent evaporation as in the formation of lacquer or shellac films and which will further dry by air oxidation or heat hardening similar to drying oil films or drying oil modified type products in which oxygen in the air causes polymerization or oxidation through the double bonds.

Other objects of the invention will appear from the following more detailed description.

In my prior applications Serial Nos. 502,317, filed September 14, 1943 (Patent 2,456,408), 535,342 filed May 12, 1944 (Patent 2,503,726), and 617,178 filed September 18, 1945 (Patent 2,558,949), I have described the preparation of polyhydric alcohols derived by the reaction of polyhydric phenols with polyhalohydrins, epihalohydrins, and polyepoxides both without and with the use of monofunctional reactants. By regulating the quantities and proportions of the reactants complex reaction products of predetermined molecular weights and predetermined hydroxyl contents can be obtained. Where chlorhydrins such as epichlorhydrin, glycerol dichlorhydrin or glycerol monochlorhydrin are used the reaction is carried out in the presence of caustic soda equal to or somewhat in excess of the amount required to combine with all of the halogen of the halohydrin. Such complex polyhydric compositions and particularly such compositions as are solid at ordinary temperature and those of much higher melting point are useful in the preparation of the new partial esters or hydroxy esters of the present invention.

In my prior application Serial No. 617,176 filed September 18, 1945 (now abandoned) and continuing applications thereof Serial Nos. 199,931 and 199,932, filed December 8, 1950, I have further described complex reaction products of polyhydric phenols with polyfunctional halohydrins such as epichlorhydrin and glycerol dichlorhydrin with the difunctional chlorhydrin used in proportions in excess of that equivalent to the polyhydric phenol and less than twice the equivalent amount, with the addition of caustic alkali equal to or somewhat in excess of the amount required to combine with the halogen of the halohydrin and giving complex polymeric products containing both epoxy groups and hydroxyl groups. Such complex polymeric epoxy-hydroxy products and compositions are also advantageously used for reaction with unsaturated acids to form the new partial esters or drying-hydroxy esters of the present invention. The complex epoxy-hydroxy compositions of my prior application Serial No. 621,856 filed October 11, 1945 (now abandoned), and continuing applications Serial Nos. 189,062 and 189,063, filed October 7, 1950, can similarly be used.

In my companion application, Serial No. 626,449 filed November 4, 1945 I have described new polyepoxy products and compositions obtained by the direct addition of polyhydric phenols and polyepoxides, with the proportion of polyepoxides used in excess of the equivalent amount so that the resulting reaction products contain epoxy groups. Such polyepoxy reaction products and particularly those which are solids at room temperature are advantageously used in making the new hydroxy ester products of the present invention.

The polyhydric alcohols used, regardless of the method of their production, are advantageously solids at ordinary temperature and in many cases products of much higher melting point are desirable. The polymeric polyhydric alcohols produced by the reaction of polyhydric phenols and polyfunctional aliphatic reactants such as polyhalohydrins, epihalohydrins and polyepoxides are complex reaction products but in general, and assuming a straight line reaction and polymerization, they contain alternating aromatic nuclei from the polyhydric phenol and aliphatic hydroxyl containing nuclei united through ether linkages. When an excess of polyhydric phenol is used some of the phenolic hydroxyl groups may be present in the final product, and products containing such terminal phenolic hydroxyl groups can be used for partial esterification. In general, however, I consider it more advantageous to use polymeric polyhydric alcohols which are free or relatively free from terminal phenolic hydroxyl groups and which contain instead either terminal non-reactive groups or terminal hydroxyl-containing or epoxy-containing groups.

In such polymeric products made from polyhydric phenols with polyfunctional halohydrins, epihalohydrins and polyepoxides there will in general be one or more alcoholic hydroxyl groups between the phenol residues and there may also be terminal alcoholic hydroxyl groups or epoxy groups.

High melting and high molecular weight products containing a lesser number of hydroxyl groups may be produced e. g., by using mixtures of dichlorhydrins or epichlorhydrins with dichlorides such as dichlordiethyl ether or dichlorbutene. Such dichlorides will give intermediate aliphatic groups between the phenolic residues which do not contain esterifiable hydroxyl groups while the residues formed from the dichlorhydrins or epichlorohydrins will contain esterifiable hydroxyl groups. Similarly products obtained by the reaction of polyhydric phenols with such dichlorides, using the polyhydric phenols in excess, and reacting the resulting complex polyhydric phenols with simple polyepoxides, will give high melting point products having a limited number of hydroxyl and epoxy groups.

The new drying compositions of the present invention are prepared by partial or limited esterification of such high molecular weight polyhydric alcohols or epoxy-hydroxy compositions with unsaturated fatty acids such as those of unsaturated vegetable oils, etc. above referred to. By limiting the esterification, that is, the number of ester groups, solid or semi-solid esters can be produced which are soluble in volatile solvents to form quick drying compositions.

In general, the high molecular weight polyhydric alcohols which are of sufficiently high melting point will contain a much larger number of hydroxyl groups than the number of ester groups desirable in the product. The esterified product will be a partial ester which still contains unesterified hydroxyl groups. The extent to which the polyhydric alcohol is esterified and the relative proportion of ester groups and unesterified hydroxyl groups will vary somewhat with the complexity and melting point and number of hydroxyl groups of the polyhydric alcohol and also to some extent with the nature of the unsaturated fatty acids used for esterification. In general, it is desirable that at least 10% and advantageously more than 25% but not more than about 75% of the hydroxyl groups present in the polyhydric alcohol or epoxy-hydroxy compound should be esterified in the final composition as illustrated in the examples, in which Example 22 illustrates about 11% of the hydroxyls esterified, Examples 12 and 14 about 28%, Example 17 about 37%, Examples 10 and 13 about 50%, Example 16 about 55%, and Examples 11 and 15 about 75% of the hydroxyls esterified. In such esterification and in considering the number of hydroxyl groups, an epoxide group is considered equivalent to two hydroxyl groups from the standpoint of esterification. However, to the extent that such epoxide groups are not esterified and are present in the partially esterified product, they may further react by polymerization or with hydroxyl groups particularly on final heat hardening of the product.

Esterification of the complex high melting point polyhydric alcohols and epoxy-hydroxy compounds may be carried out in accordance with known esterification methods. Esterification is not difficult since a large excess of hydroxyl groups are present in the alcohol to be esterified. The new esters are conveniently made by high temperature esterification at temperatures ranging from 150° C. to 300° C. The esterification is readily carried out by bubbling through the reaction mixture a slow stream of inert gas such as carbon dioxide which serves to carry the water of esterification from the reaction mixture. The esterification may also be carried out by refluxing with a small amount of water-insoluble solvent, using a suitable reflux condenser, such as a Bidwell-Sterling condenser, for removal of the water.

The esterification is readily carried to substantial completion, so far as the fatty acids used are concerned, giving esters which are partial esters in the sense that only part of the esterifiable hydroxyl groups are esterified and leaving part of the hydroxyl groups in a free state in the product.

It is one of the advantages of the new synthetic drying compositions that the high molecular weight and high melting point polyhydric polyalcohols and epoxy-hydroxy compounds used for the partial esterification are usually highly insoluble in water so that unesterified hydroxyl groups in the final products show little tolerance for water, while the presence of such hydroxyl groups contributes desirable adhesion characteristics to the films formed therefrom.

Thus the new compositions form films which have remarkable adhesion to wood, metal, glass and fiber surfaces. Moreover, such films, although containing a high percentage of unesterified hydroxyl groups, are highly resistant to water and alkali.

The presence of the unesterified hydroxyl groups in the partial esters also appears to effect an increase in the resulting melting point of the esters so that in most cases the products are dry solids rather than typical sticky varnish compositions.

It is a characteristic of the products of the present invention that their solutions in solvents may be applied as thin films and these films are dry to touch as soon as the solvent has evaporated or very shortly thereafter. Moreover, and in addition to this drying by solvent evaporation, the new compositions have sufficient unsaturation present in the fatty acid residues of the esters to convert the films by oxidation or heat hardening to insoluble, infusible products.

The new compositions accordingly may be considered to combine in a single composition two types of film drying, namely, that of solvent evaporation as is the case in the formation of lacquer and shellac films, and that of drying oil modified type products in which oxygen in the air causes polymerization or oxidation through the double bonds.

In most conventional unsaturated drying compositions a functionality of about 6 double bonds per molecule is usually necessary for satisfactory air-drying schedules of 12 to 14 hours.

This requirement is not necessary with the products of the present invention. Low functionality in the number of double bonds per molecule is sufficient for the products of the present invention since a satisfactory preliminary dry is obtained in a very short time by mere evaporation of the solvent. Even if the film requires a week or more to become insoluble and infusible after this preliminary dry this would be satisfactory since the final characteristics are not usually required for some time after application.

It is a further advantage of the new hydroxyester compositions that although they give films which dry substantially as rapidly as shellac films, the films are nevertheless very flexible and possess durability characteristics of China-wood oil varnishes. The abrasion characteristics of the new hydroxy ester films are very superior to those for shellac films and comparable to those for the best oleoresinous varnishes. Similarly, the chemical resistance of the new hydroxy ester films (to water, oxidation, alkali, alcohol, acids, etc.) is remarkably good.

Solutions of the new hydroxy esters may be used directly as varnishes or they may be blended with other resins and drying compositions before application, depending on the film properties desired. It is sometimes advantageous to add small amounts of phenolic resins, rosin esters, or other resins to the new hydroxy esters for use in formation of modified films.

The new hydroxy esters, because of their free hydroxyl groups, are capable of further reaction through these free hydroxyl groups. These hydroxyl groups are capable of reaction, e. g., with epoxide groups of polyepoxy compounds or complex epoxides such as are described in my companion applications Serial Nos. 189,062 and 189,063, filed October 7, 1950, 199,931 and 199,932, filed December 8, 1950, and 626,449, filed November 2, 1945. The new hydroxy esters of the present invention may thus be compounded with the complex epoxides or polyepoxides or epoxyhydroxy compounds of said companion applications to form new reaction products in which the epoxide groups of the complex epoxide compositions combine with the hydroxyl groups of the hydroxy esters to form complex reaction products. The reaction between epoxide and hydroxyl groups takes place without formation of byproducts and by direct addition to form ether linkages.

By using the new hydroxy esters with the complex epoxy compositions such as those of the examples of said companion applications, in proportions to bring about sufficient reaction of epoxide groups with a large part of the free hydroxyl groups present in the hydroxy esters, e. g., in equivalent proportions or with an excess of the epoxide, and on heating the resulting mixture with a small amount of a catalyst such as an alkali phenoxide, reaction products can be obtained which are infusible. The reaction mixtures which give such infusible reaction products are valuable for use in making molding mixtures, films and for other purposes.

The new hydroxy esters can also advantageously be compounded with varying amounts of simple polyepoxides such as 1,2-epoxy-3,4-epoxy butane and diglycide ether and the resulting mixture can be heated, particularly with a small amount of catalyst such as boron trifluoride or an alkali phenoxide to bring about reaction and cross-linking, the epoxy groups and hydroxyl groups combining by direct addition to form ether linkages.

Other coupling agents such as polybasic acids, polyisocyanates and aldehydes may also be admixed with the new compositions and reacted therewith, through the free hydroxyl groups, to give complex reaction products.

These other reactions to which the new hydroxy esters can be subjected may be combined with the use of the esters in making coating compositions. Thus quick drying coating compositions can be made by dissolving the new hydroxy esters in a volatile solvent together with other reagents which will react therewith, such as epoxy compositions, etc., and the resulting film, after evaporation of the solvent, can then be subjected to a high temperature to effect the desired reaction and final hardening of the composition.

The invention will be further illustrated by the following examples, but it will be understood that the invention is not limited thereto.

The following nine examples illustrate the production of various polyhydric alcohols suitable for partial esterification to form the new hydroxy esters:

*Example I.*—To 24 mols of sodium hydroxide (960 parts dissolved in 11,000 parts of water) was added 21 mols of bis phenol and 6 mols of phenol. The phenols were dissolved by heating to 95° C. with stirring and the resulting solution was allowed to stand overnight. To this solution, which had cooled to 26° C., was added 24 mols of epichlorhydrin. With continuous agitation the reaction mixture was heated to 55° C. over a period of 40 minutes. Six mols of sodium hydroxide was added and the temperature of the reaction mixture was raised to 93° C. over a period of 1 hour and 45 minutes. The reaction mixture was held between 93° C. and 100° C. for 55 minutes. The upper water layer was removed by decantation and the taffy resin layer was washed 4 times by agitation with boiling water, removing the wash water each time by decantation. A small amount of acetic acid was added during the third and fourth washes to neutralize any unreacted caustic remaining in the resin.

The taffy-like resin was finally dried by heating with continued agitation until the temperature had risen above the boiling point of water. The softening point (Durrans mercury method) was 113° C. The equivalent weight to esterification as obtained by heating with about 100% excess linseed oil acids at 228° C. until a constant acid number was obtained was 310.

*Example II.*—A polyhydric alcohol was prepared from 40 mols of bis phenol, 31 mols epichlorhydrin and 18 mols glycerol monochlorhydrin and following the same general procedure as described in Example I. The softening point was 116–117° C. The equivalent weight to esterification (determined as in Example I) was 204.

*Example III.*—To 20 mols of sodium hydroxide (800 parts dissolved in 10,000 parts of water) was added 18.1 mols of bis phenol and 3.8 mols of phenol. The phenols were dissolved by heating to 80° C. with stirring and the resulting solution was allowed to stand overnight. To this solution which had cooled to 28° C. was added 20 mols of epichlorhydrin. With continuous agitation the reaction mixture was heated to 90° C. over a period of one hour. To the reaction mixture was added 5 mols of sodium hydroxide. The container was closed so as to stand steam pressure and the reaction mixture was heated at 120–125° C. for 30 minutes. The batch was cooled to 100° C. and the upper water layer was removed by decantation. Boiling water was added, the kettle closed and the resin was washed by stirring for 20 minutes with the water heated to 125° C. The contents were again cooled and the water layer removed by decantation. The washing was repeated 3 times using a small amount of acetic acid with the second and third wash to neutralize unreacted sodium hydroxide. The product was dried by heating, with continued agitation until all of the water was removed. The product softened at 128–129° C., and it had an equivalent weight to esterification (determined as in Example I) of 310.

*Example IV.*—A polyhydric alcohol was prepared from 24 mols of bis phenol, 12 mols of phenol and 30 mols of epichlorhydrin following the same general procedure as in Example I. The softening point was 94–95° C. and the equivalent weight to esterification (determined as in Example I) of around 310.

*Example V.*—A polyhydric alcohol was prepared from 0.86 mol bis phenol, 0.28 mol phenol and 1 mol epichlorhydrin, following the same general procedure as in Example I. The softening point was 115° C. and the equivalent weight to esterification (determined as in Example I) was around 310.

*Example VI.*—A polyhydric alcohol was prepared from 2.5 mols of bis phenol, 2.5 mols of p,p'-dihydroxydiphenyl sulfone and 6 mols of epichlorhydrin following the same general procedure as in Example I. The softening point was 127° C.

*Example VII.*—To 3.87 mols of sodium hydroxide (151 parts dissolved in 1500 parts of water) was added 3 mols of resorcinol. To this solution was added 3.5 mols of epichlorhydrin and the mixture was gradually heated to 82° C. over a period of 28 minutes. A solution of 0.875 mol of sodium hydroxide (35 parts in 150 parts of water) was added over a period of 17 minutes. The reaction mixture was then heated gradually to 99° C. over a period of 27 minutes. The water layer was removed by decantation and the resulting resin was washed and dried according to the procedure in Example I. The product softened at 80° C.

*Example VIII.*—To 70.4 mols of sodium hydroxide (2816 parts dissolved in 18,000 parts of water) was added 37.5 mols (855 parts) of bis phenol and the resulting mixture stirred for about 15 minutes. To this solution was added 52.5 mols of epichlorhydrin. Over a period of 1 hour and 24 minutes and with continuous agitation the temperature was gradually raised to boiling and held at this temperature (101–105° C.) for 1 hour. The upper water layer was removed by decantation. The resulting resin was washed and dried according to the procedure used in Example I. The product softened at 92° C.

*Example IX.*—To 765 parts of the product of Example VIII was added 102.5 parts of bis phenol. This reaction mixture was heated for 1 hour and 40 minutes at 170–200° C., with continuous agitation, to give a product melting at 125° C.

The foregoing examples are illustrative of various polyhydric alcohols suitable for use in making the new partial esters or hydroxy esters. And various other polyhydric alcohols can be similarly used such as are described in my companion applications previously referred to.

The following examples, X to XXI, inclusive, illustrate the production of the new partial esters or hydroxy esters by limited esterification of the alcohols of the preceding examples:

*Example X.*—In a reaction vessel provided with a mechanical stirrer was placed 500 parts of the product of Example I and 220 parts of the dehydrated castor oil acids. These materials were heated, with continuous agitation, at 250–255° C. until the acid value had dropped to 0.6. Carbon dioxide was bubbled through the reaction mixture during esterification.

The resulting product was a semi-brittle solid at room temperature. When dissolved in xylene to give a 50% solution, the viscosity was X (bubble viscosimeter).

Additional aromatic or lacquer solvent may be used to lower the viscosity to a consistency suitable for film application by brushing or spraying.

*Example XI.*—A wax like solid ester having an acid value of 5 was prepared from 500 parts of the product of Example I and 335 parts of dehydrated castor oil acids by heating for 3 hours at 255° C. with continued agitation.

A 50% solution of this product in xylene had a viscosity of I–J. A 0.0015 inch film of this product when baked for ½ hour at 150° C. gave an extremely hard, tough film. Similar films were formed by air drying at room temperature, the film being tack free after 45–60 minutes and extremely hard and tough after 24 hours.

*Example XII.*—To 500 parts of the product of Example I was added 125 parts of dehydrated castor oil acids and the resulting mixture was heated for 2 hours at 250–255° C.

The product was a brittle solid at room temperature having an acid value of 0.86. A 50% solution in xylene had a viscosity of $Z_1$–$Z_2$. After further diluting this solution with aromatic solvents or lacquer solvents it is suitable for the application of thin films which are dry to touch as soon as the solvent has evaporated from the film. This dry to touch time is about 10 minutes. The air drying continues for 24 hours or more until the films finally become very hard and tough.

*Example XIII.*—To 500 parts of the product of Example II was added 335 parts of linseed oil acids and this mixture was heated with stirring to give a product whose acid value was 0.97 and the viscosity of a 50% solution in xylene was E.

*Example XIV.*—To 250 parts of the product of Example I was added 62.5 parts of oiticica oil acids and the resulting mixture was cooked at 250° C. for 1 hour with agitation to give a solid product having an acid value of 2. A solution of 40 parts of this solid product dissolved in 40 parts of xylene and 20 parts of isopropyl acetate gave an excellent varnish for application as films.

*Example XV.*—To 500 parts of the product of Example III was added 335 parts of dehydrated castor oil acids. This mixture was heated with agitation, at 250° C. for 4 hours to give a semi-solid product having an acid value of 5.1. A 50% solution of this product in xylene gave a viscosity of S–T.

*Example XVI.*—To 200 parts of the product of Example IV was added 100 parts of soy bean oil acids. This mixture was heated at 250° C. with agitation until the acid value was 2.2. This semi-solid product was dissolved in xylene and treated with 0.05% on solids of cobalt drier to give a very rapid drying varnish.

*Example XVII.*—To 210 parts of the product of Example V was added 70 parts of linseed oil fatty acids and the resulting mixture was heated at 250° C., with continuous agitation, until the acid value was 4. The resulting solid resin when dissolved in aromatic or lacquer solvents gave a very rapid drying varnish.

*Example XVIII.*—To 200 parts of the product of Example VIII was added 100 parts of dehydrated castor oil acids. This mixture was heated, with continuous agitation, for 2 hours at 230° C. giving a solid product having an acid value of 2.5. A 50% solution of this product in xylene had a viscosity of S, and this solution is an excellent fast drying varnish, especially when a trace of cobalt drier is used.

*Example XIX.*—To 500 parts of the product of Example VI was added 202 parts of linseed oil acids and the resulting mixture was heated, with continued agitation, at 250° C. until the acid value was 2.57. A 35% solution of this product was made in xylene and this solution was used to spread 0.003 inch films which become tack free after about 10 minutes and very tough and hard after 24 hours air dry.

*Example XX.*—To 200 parts of the product of Example VII was added 100 parts of dehydrated castor oil acids and the resulting mixture was heated, with continuous agitation, at 230–235° C. until the acid value was 4.8. A 75% solution of this solid product in mineral spirits (aliphatic hydrocarbons) could be obtained. Further dilution required aromatic or lacquer type solvents.

*Example XXI.*—To 200 parts of the product of Example IX was added 100 parts of oleic acid and the resulting mixture was heated with continuous agitation, at 225 to 230° C. until the acid value was 5.9. The product was a solid which is readily soluble in aromatic or lacquer solvents.

*Example XXII.*—A mixture of 39 parts of diglycid ether and 45.6 parts of bis phenol were heated, with agitation, at 190 to 215° C. for 1½ hours to give a product softening at 88° C. To this product was added 25 parts of linseed oil acids and the resulting mixture was heated at 225° C. with stirring until the acid value was 5. This product dissolved in lacquer solvents gave an excellent fast drying finish.

Example XXII illustrates the production of an epoxy-hydroxyl resin from a polyhydric phenol and a polyepoxide and the formation of a partial ester of such resin. Other complex epoxy-hydroxyl resins can be similarly made by direct addition reaction of polyhydric phenols and polyepoxides as described in my companion application Serial No. 626,449 filed November 2, 1945, and the partial esterification in a similar manner.

So also, various other high molecular weight polyhydric alcohols and epoxy-hydroxy compounds, such as described in said companion applications, can be similarly used. And various unsaturated fatty acids can be used in varying proportions to give a wide variety of final products.

In general, to produce quick drying partial esters, the polyhydric alcohol used should have a sufficiently high softening point, e. g., above about 60° C. in order to obtain therefrom a solid partial ester capable of quick drying to give a dry film. Such partial esters form solutions which after application are capable of a preliminary dry by solvent evaporation. With an alcohol melting at around 60° C. only limited esterification is possible if the partial ester is to be solid at room temperature. With higher melting alcohols a higher percentage by weight of unsaturated acids can be used and still give solid partial esters.

Partial esters which are not solid at room temperature are not so well suited for use in making quick drying compositions unless other reagents are also present, but are useful in coupling reactions where use is made of the free hydroxyl groups to react with the other groups, e. g., epoxy groups of complex epoxy compounds.

In general the new partial esters or hydroxy esters which are quick drying compositions when used in solution in volatile solvents are those which are solids at ordinary temperatures and contain sufficient unsaturation to convert the film eventually to an infusible, insoluble product.

I claim:

1. New partial esters of complex resinous polyhydric alcohols with higher unsaturated fatty acids, said polyhydric alcohols being polymeric polyether derivatives of dihydric phenols, which dihydric phenols are free from functional groups other than phenolic hydroxyl groups, said polyhydric alcohols having a plurality of alternating aromatic nuclei and of aliphatic chains united through ether oxygen, the aromatic nuclei being the hydrocarbon nucleus of the dihydric phenol and being free from functional groups, and the aliphatic chains being free from substituents other than alcoholic hydroxyl groups and esterified alcoholic hydroxyl groups esterified with said unsaturated fatty acids, part of said aliphatic chains having alcoholic hydroxyl groups esterified with said unsaturated fatty acids and part of said aliphatic chains containing free alcoholic hydroxyl groups, the proportion of esterified hydroxyl groups and free alcoholic hydroxyl groups being from about 10% esterified and 90% free hydroxyl groups to about 75% esterified and 25% free hydroxyl groups, said partial esters being solids at ordinary temperatures and soluble in volatile solvents to form quick drying compositions capable of subsequent further hardening by oxidation.

2. New partial esters as defined in claim 1 in which the aromatic nuclei are diphenyl dimethyl methane nuclei.

3. New quick drying coating compositions containing the partial esters of claim 1 dissolved in a volatile organic solvent, said compositions being valuable coating and film forming compositions which form a dry film on evaporation of the solvent capable of conversion by oxidation to an infusible, insoluble film.

4. New quick drying coating compositions containing the partial esters of claim 2 dissolved in a volatile organic solvent, said compositions being valuable coating and film forming compositions which form a dry film on evaporation of the solvent capable of conversion by oxidation to an infusible, insoluble film.

5. New partial esters of complex resinous polyhydric alcohols with higher unsaturated fatty acids, said polyhydric alcohols being polymeric polyether derivatives of dihydric phenols, which dihydric phenols are free from functional groups other than phenolic hydroxyl groups, said polyhydric alcohols having a plurality of alternating aromatic nuclei and of aliphatic chains united through ether oxygen, the aromatic nuclei being the hydrocarbon nucleus of the dihydric phenol and being free from functional groups, and the aliphatic chains being free from substituents other than alcoholic hydroxyl groups and esterified alcoholic hydroxyl groups esterified with said unsaturated fatty acids, part of said aliphatic chains having alcoholic hydroxyl groups esterified with said unsaturated fatty acids and part of said aliphatic chains containing free alcoholic hydroxyl groups, the proportion of esterified hydroxyl groups and free alcoholic hydroxyl groups being from about 10% esterified and 90% free hydroxyl groups to about 50% esterified and 50% free hydroxyl groups, said partial esters being solids at ordinary temperatures and soluble in volatile solvents to form quick drying compositions capable of subsequent further hardening by oxidation.

6. New partial esters as defined in claim 5 in which the aromatic nuclei are diphenyl dimethyl methane nuclei.

7. New quick drying coating compositions containing the partial esters of claim 5 dissolved in a volatile organic solvent, said compositions being valuable coating and film forming compositions which form a dry film on evaporation of the solvent capable of conversion by oxidation to an infusible, insoluble film.

8. New quick drying coating compositions containing the partial esters of claim 6 dissolved in a volatile organic solvent, said compositions being valuable coating and film forming compositions which form a dry film on evaporation of the solvent capable of conversion by oxidation to an infusible, insoluble film.

SYLVAN OWEN GREENLEE.

References Cited in the file of this patent

UNITED STATES PATENTS

| Number | Name | Date |
|---|---|---|
| 2,060,715 | Arvin | Nov. 10, 1936 |
| 2,213,477 | Steindorff et al. | Sept. 3, 1940 |
| 2,324,483 | Castan | July 20, 1943 |
| 2,456,408 | Greenlee | Dec. 14, 1948 |

FOREIGN PATENTS

| Number | Country | Date |
|---|---|---|
| 576,177 | Germany | May 8, 1933 |